United States Patent
Bulot et al.

(10) Patent No.: US 11,971,310 B2
(45) Date of Patent: Apr. 30, 2024

(54) METHOD FOR PRODUCING AN OPTICAL FIBRE FOR A DISTRIBUTED MEASUREMENT OF TEMPERATURE OR DEFORMATION IN A HARSH ENVIRONMENT USING THE RAYLEIGH BACKSCATTERED SIGNAL

(71) Applicants: COMMISSARIAT A L'ENERGIE ATOMIQUE ET AUX ENERGIES ALTERNATIVES, Paris (FR); CENTRE NATIONAL DE LA RECHERCHE SCIENTIFIQUE, Paris (FR); UNIVERSITE DE LILLE, Lille (FR)

(72) Inventors: Patrick Bulot, Villeneuve d'Ascq (FR); Remy Bernard, Villeneuve d'Ascq (FR); Odile Cristini, Villeneuve d'Ascq (FR); Monika Bouet, Marquette Lez Lille (FR); Guillaume Laffont, Meudon (FR); Marc Douay, Villeneuve d'Ascq (FR)

(73) Assignees: COMMISSARIAT A L'ENERGIE ATOMIQUE ET ENERGIES ALTERNATIVES, Paris (FR); CENTRE NATIONAL DE LA RECHERCHE SCIENTIFIQUE, Paris (FR); UNIVERSITE DE LILLE, Lille (FR)

( * ) Notice: Subject to any disclaimer, the term of this patent is extended or adjusted under 35 U.S.C. 154(b) by 538 days.

(21) Appl. No.: 17/254,080

(22) PCT Filed: Jun. 21, 2019

(86) PCT No.: PCT/FR2019/051516
§ 371 (c)(1),
(2) Date: Dec. 18, 2020

(87) PCT Pub. No.: WO2019/243752
PCT Pub. Date: Dec. 26, 2019

(65) Prior Publication Data
US 2021/0262868 A1 Aug. 26, 2021

(30) Foreign Application Priority Data

Jun. 22, 2018 (FR) ..................... 18 55602

(51) Int. Cl.
*G01K 11/32* (2021.01)
*C03B 37/014* (2006.01)
(Continued)

(52) U.S. Cl.
CPC .......... *G01K 11/32* (2013.01); *C03B 37/0144* (2013.01); *C03B 37/02718* (2013.01);
(Continued)

(58) Field of Classification Search
CPC . G01K 11/32; G01K 3/06; G01K 3/14; G01K 11/3206; C03B 37/0144;
(Continued)

(56) References Cited

U.S. PATENT DOCUMENTS 4,626,110 A * 12/1986 Wickersheim ..... G01K 11/3213
374/161
2002/0163639 A1* 11/2002 Stephenson ............... G01J 3/44
356/301
(Continued)

FOREIGN PATENT DOCUMENTS

CN 103894622 A 7/2014
CN 104327610 A * 2/2015 ........... C09D 125/08
(Continued)

OTHER PUBLICATIONS

17254080_2024-01-09_JP_2004536775_A_H.pdf,Dec. 9, 2004.*
(Continued)

*Primary Examiner* — Gail Kaplan Verbitsky
(74) *Attorney, Agent, or Firm* — Oblon, McClelland, Maier & Neustadt, L.L.P.

(57) ABSTRACT

An optical fibre, for use in the field of distributed measurement of temperature or deformation by optical reflectometry in the frequency domain using the Rayleigh backscattered signal in the fibre, includes a core doped with nanoparticles for example formed from gold particles covered with zirconium oxide, and can be subjected to high temperatures during the measurement. A method for producing the optical
(Continued)

fibre includes a step of heat treatment during which the optical fibre is subjected, for a duration of at least one hour, to a heat treatment temperature higher than a maximum temperature to which it will be subjected during a measurement.

11 Claims, 3 Drawing Sheets

(51) Int. Cl.
    *C03B 37/027*     (2006.01)
    *G01B 11/16*     (2006.01)
    *G02B 6/02*     (2006.01)

(52) U.S. Cl.
    CPC ............ *G01B 11/16* (2013.01); *G02B 6/0229* (2013.01); *C03B 2201/40* (2013.01)

(58) Field of Classification Search
    CPC .......... C03B 37/02718; C03B 2201/40; C03B 37/01413; G01B 11/16; G02B 6/0229; G02B 6/02204; G01L 1/246; G01N 21/774
    See application file for complete search history.

(56) References Cited

U.S. PATENT DOCUMENTS

| | | | |
|---|---|---|---|
| 2005/0111805 A1 | 5/2005 | Hertz et al. | |
| 2007/0165217 A1* | 7/2007 | Johansson | G01N 21/658 356/301 |
| 2010/0135627 A1* | 6/2010 | Pastouret | H01S 3/06716 359/341.1 |
| 2015/0069611 A1* | 3/2015 | Martin | H01L 31/1804 438/607 |
| 2017/0229724 A1* | 8/2017 | Chen | H01M 8/04335 |
| 2019/0056249 A1* | 2/2019 | Artuso | C03B 37/0253 |

FOREIGN PATENT DOCUMENTS

| | | | | |
|---|---|---|---|---|
| CN | 205120269 U | * | 3/2016 | |
| CN | 107990998 A | * | 5/2018 | ............ G01K 11/32 |
| CN | 110763363 A | * | 2/2020 | |
| CN | 111223173 A | * | 6/2020 | |
| CN | 112291007 A | * | 1/2021 | ............ H04B 10/25 |
| CN | 115014572 A | * | 9/2022 | |
| DE | 102006013266 A1 | * | 10/2006 | ........ B29C 71/0063 |
| EP | 1764350 A1 | * | 3/2007 | ............ B82Y 20/00 |
| EP | 1783872 A1 | * | 5/2007 | ............ B82Y 20/00 |
| EP | 2 457 882 A1 | | 5/2012 | |
| EP | 2457882 A1 | * | 5/2012 | ......... C03B 37/0122 |
| FR | 2 952 634 A1 | | 5/2011 | |
| FR | 2952634 A1 | * | 5/2011 | ....... C03B 37/08138 |
| FR | 3082955 A1 | * | 12/2019 | ....... C03B 37/01413 |
| JP | 2004286878 A | * | 10/2004 | |
| JP | 2004317802 A | * | 11/2004 | |
| JP | 2004536775 A | * | 12/2004 | |
| WO | WO-2015199424 A1 | * | 12/2015 | ......... G01D 5/35303 |
| WO | WO-2019243752 A1 | * | 12/2019 | ....... C03B 37/01413 |
| WO | WO-2021209604 A1 | * | 10/2021 | ......... G01D 5/35306 |
| WO | WO-2022170141 A1 | * | 8/2022 | ............ G01K 11/32 |

OTHER PUBLICATIONS

17254080_2024-01-09_EP_1764350_A1_H.pdf,Mar. 21, 2007.*
Yan, A. et al., "Distributed Optical Fiber Sensors with Ultrafast Laser Enhanced Rayleigh Backscattering Profiles for Real-Time Monitoring of Solid Oxide Fuel Cell Operations," Scientific Reports, vol. 7, Aug. 24, 2017, pp. 1-9.
Loranger, S. et al., "Rayleigh scatter based order of magnitude increase in distributed temperature and strain sensing by simple UV exposure of optical fibre," Scientific Reports, vol. 5, Jun. 16, 2015, pp. 1-7.
French Preliminary Search Report (with English translation of categories) dated Feb. 28, 2019 in French Application No. 18 55602 filed on Jun. 22, 2018, 2 pages.
International Search Report dated Oct. 1, 2019 in PCT/FR2019/051516 filed on Jun. 21, 2019, 2 pages.

* cited by examiner

METHOD FOR PRODUCING AN OPTICAL FIBRE FOR A DISTRIBUTED MEASUREMENT OF TEMPERATURE OR DEFORMATION IN A HARSH ENVIRONMENT USING THE RAYLEIGH BACKSCATTERED SIGNAL

TECHNICAL FIELD

The invention lies in the field of distributed measurement of temperature or of deformation by optical frequency domain reflectometry using the Rayleigh backscattered signal in an optical fibre subjected to a harsh environment. The optical fibre can in particular be subjected to temperatures greater than 400° C. and/or to ionising or non-ionising radiation. It relates to a method for manufacturing an optical fibre comprising a heat treatment step allowing the properties of the optical fibre to be stabilised before the measurement. The invention also relates to a use of the optical fibre thus treated.

The invention applies in particular to the control of the temperature in a nuclear reactor or in a hydrogen fuel cell, or to the measurement of temperature and of deformation in a borehole.

PRIOR ART

The technique of optical frequency domain reflectometry, called OFDR, allows measurements of temperature or of deformation along the entire length of an optical fibre to be provided by using the Rayleigh backscattered signal produced in the optical core of the optical fibre. A measurement of temperature using the Rayleigh backscattered signal is calculated by comparing this signal over a fibre portion to a reference signal. During a variation in temperature, the frequency of the Rayleigh signal corresponding to the fibre portion considered is offset. A lookup table or an analogous relationship allows this frequency offset to be made to correspond to the variation in temperature undergone in the fibre portion considered. In order to amplify the signal backscattered by Rayleigh scattering and, subsequently, increase the precision of measurement, it was proposed in S. Loranger et al, "Rayleigh scatter based order of magnitude increase in distributed temperature and strain sensing by simple UV exposure of optical fibre", Scientific Reports 5 (2015), to create defects in the core of the optical fibre by exposing it to ultraviolet laser radiation. Another solution, proposed in A. Yan et al, "Distributed Optical Fiber Sensors with Ultrafast Laser Enhanced Rayleigh Backscattering Profiles for Real-Time Monitoring of Solid Oxide Fuel Cell Operations", Scientific Reports 7 (2017), involves inscribing nanogratings in the core of the optical fibre by exposing it to femtosecond laser radiation. These techniques allow the intensity of the Rayleigh backscattered signal to be greatly increased, by approximately 40 dB for an optical fibre comprising nanogratings. However, the laser treatment of the optical fibre is relatively complex and long to implement on large lengths of optical fibres. Moreover, the attenuation resulting from these treatments is relatively significant, approximately 10 dB/m on an optical fibre treated by femtosecond laser.

The inventors sought to develop a solution for obtaining an optical fibre dedicated to a distributed measurement of temperature or of deformation which has both a significant intensity of Rayleigh backscattered signal and low attenuation. They have demonstrated the feasibility and the interest of using an optical fibre, the core of which is doped with nanoparticles, for example formed by particles of gold covered with zirconium oxide, commonly called zircone. According to the doping carried out, in particular its concentration of nanoparticles, significant results were obtained. In particular, at ambient temperature, an increase in the Rayleigh backscattered signal of 40.6 dB was able to be observed for an attenuation in the fibre of 3.1 dB/m, or an increase of the Rayleigh backscattered signal of 32 dB for an attenuation of 0.5 dB/m. These results open the possibility of carrying out measurements over great lengths, in particular over several metres. However, when the optical fibre is exposed to high temperatures over long durations, in particular more than 800° C. over several hours, the measurements undergo a drift that make them difficult to use. The measurement errors can consist of a continuous modification of the measured temperature (at constant temperature) or of variations of several hundred degrees.

Given the above, the goal of the invention is to provide an optical fibre for a distributed measurement of temperature or of deformation that allows stable measurements to be provided over extended ranges of temperatures, in particular at temperatures greater than or equal to 800° C.

DISCLOSURE OF THE INVENTION

For this purpose, the invention is based on the use of an optical fibre doped with nanoparticles and the application of a heat treatment to the optical fibre at a temperature greater than the temperature of the measurement environment of the fibre. The presence of nanoparticles has the effect of amplifying the Rayleigh scattering and thus the amplitude of the Rayleigh backscattered signal. The inventors were able to identify that the measurement errors are caused by a permanent modification of the Rayleigh signature of the optical fibre under the effect of heat. More precisely, by being exposed to high temperatures, the optical fibre undergoes a modification of its physico-chemical properties before reaching a stabilised state. The modifications of the physico-chemical properties relate in particular to the relaxation of the stresses inside the optical fibre after the step of drawing the preform, the chemical migrations of possible dopants in the optical fibre, and the physico-chemical modifications of the nanoparticles. These modifications affect the local fluctuations in density responsible for the Rayleigh backscattering in the core of the optical fibre. The heat treatment has the effect of stabilising the response of the optical fibre and thus the measurements of temperature and of deformation.

More precisely, the object of the invention is a method for manufacturing an optical fibre intended to be used for a distributed measurement of temperature or of deformation by optical frequency domain reflectometry using the Rayleigh backscattered signal, the optical fibre comprising a core into which nanoparticles are inserted, the optical fibre being subjected, during the measurement, to temperatures in a predetermined range of measurement temperatures, the method comprising a step of heat treatment during which the optical fibre is subjected to a heat treatment temperature greater than or equal to an upper limit of the predetermined range of measurement temperatures for a duration of heat treatment greater than or equal to one hour.

According to the invention, the heat treatment is carried out on the optical fibre, i.e. after a step of drawing a preform allowing the optical fibre to be formed. Consequently, the heat treatment is also carried out after the insertion of the nanoparticles.

The optical fibre is preferably a single-mode fibre. It has for example a core diameter between 4 μm (micrometres) and 10 μm and a cladding diameter between 100 μm and 125 μm.

In the sense of the invention, nanoparticles are particles, the greatest dimension of which is less than or equal to 100 nm (nanometres). The nanoparticles have for example, in each of the three dimensions, a dimension of several nanometres or tens of nanometres. The nanoparticles do not necessarily have a spherical or substantially spherical shape. Instead of or in addition to the nanoparticles, the core of the optical fibre can include clusters, i.e. an assembly of atoms, the greatest dimension of which is between the dimension of a molecule and that of a nanoparticle.

The core of the optical fibre preferably includes a molar percentage of nanoparticles less than or equal to 10%, more preferably less than 5%. In the presence of clusters, the molar percentage of clusters or, as the case may be, of clusters and of nanoparticles, is preferably less than or equal to 10%, more preferably less than 5%.

The upper limit of the predetermined range of measurement temperatures can be determined according to the use. It is for example between 400° C. and 1200° C. It is preferably between 800° C. and 1100° C. Moreover, the heat treatment temperature is preferably less than or equal to the glass transition temperature of silica in crystalline form, or approximately 1200° C., in order to avoid a degradation of the optical fibre. Thus, the heat treatment temperature can be comprised in a heat treatment range between 400° C. and 1200° C., preferably between 800° C. and 1100° C.

The duration of heat treatment can be determined according to the optical fibre, in particular its dimensions and its composition, and the composition of the nanoparticles. The duration of heat treatment can in particular be greater than or equal to 8 hours, preferably greater than or equal to 10 hours. The inventors were able to note that the Rayleigh backscattering properties were more stable starting from the application of a heat treatment of one hour. They also observed a clearly improved stabilisation for a duration of heat treatment of at least 8 hours. The duration of heat treatment can moreover be less than 48 hours, preferably less than 24 hours.

The step of heat treatment can be carried out by any means capable of subjecting the optical fibre to a heat treatment temperature greater than the upper limit of the predetermined range of measurement temperatures. According to a first alternative embodiment, the step of heat treatment comprises the heating of the optical fibre in an oven. According to a second alternative embodiment, the step of heat treatment comprises the application of a carbon dioxide laser beam to the optical fibre. Preferably, the heat treatment is applied at least to the section(s) of the optical fibre used for the distributed measurement of temperature or of deformation.

The manufacturing method can further include a step of insertion of the nanoparticles into the core of the optical fibre.

According to a first alternative embodiment, the step of insertion of nanoparticles into the core of the optical fibre is carried out on a preform comprising a tube made of silica glass and a porous layer of amorphous silica disposed on an inner surface of the tube. The step of insertion of nanoparticles thus comprises an impregnation of the porous layer by a solution comprising the nanoparticles. Preferably, the preform is rotated about its longitudinal axis during the impregnation.

According to a specific embodiment, the solution comprises, in addition to the nanoparticles, at least one solvent such as ethanol or water. The solution can also include a sol of zirconium oxide and/or a sol of silica. The sol of zirconium oxide and the sol of silica have the effect of covering the particles with a layer of amorphous zirconium oxide or of silicon oxide in amorphous form forming a protective layer for the nanoparticles. The nanoparticles thus covered preferably preserve a nanometric dimension, i.e. their greatest dimension is less than or equal to 100 nm. These protective layers, made of zirconium oxide or of silicon oxide, can crystallise during the heat treatment of the preform while preserving their nanometric dimension.

The manufacturing method can include, before the impregnation of the porous layer, a step of forming this porous layer from amorphous silica. The porous layer can be doped in such a way as to increase its refractive index. The doping is for example carried out with germanium and/or with phosphorus. It should be noted that such a doping is not indispensable, in particular in the case in which the nanoparticles comprise a layer of zirconium oxide, the zirconium being capable of diffusing into the glass during the various heat treatments carried out on the preform and the optical fibre. This results in an increase of the refractive index of the core of the optical fibre. In one embodiment, the porous layer is deposited by a modified chemical vapour deposition method, also called MCVD method. In particular, a mixture of gases comprising silicon tetrachloride ($SiCl_4$), germanium tetrachloride ($GeCl_4$), phosphoryl trichloride ($POCl_3$), dioxygen ($O_2$) and helium (He) can be injected into a tube made of silica glass and brought to high temperature, typically between 1300° C. and 1500° C. using a torch heating the tube from the outside. The tube made of silica glass is rotated about its longitudinal axis during the heating. After this step, a porous layer of amorphous silica doped with germanium and with phosphorus is formed on the inner surface of the tube. The porous layer is intended to form the core of the optical fibre, the tube being intended to form the cladding.

The manufacturing method can also include, after the impregnation of the porous layer:
- a step of removing the excess solution and of drying the preform. The drying is for example carried out at ambient temperature, i.e. at a temperature between 15° C. and 30° C.;
- a step of densification and of thermal vitrification of the porous layer between 1700° C. and 2000° C.;
- a step of thermal sealing of the tube by heating between 1900° C. and 2200° C., the tube preferably being rotated about its longitudinal axis.

According to a second alternative embodiment, the step of inserting nanoparticles into the core of the optical fibre is carried out by impregnation, with a solution containing the nanoparticles, of a porous monolith of silica formed by a sol-gel process, which is used as the core of the preform. This monolith is then dried, for example at ambient temperature in open air, then is thermally densified between 1200° C. and 1400° C. The densified monolith is then inserted into a tube made of silica glass, used as optical cladding, then the assembly is heated to obtain the preform of the final optical fibre.

According to the first and second alternative embodiments, the manufacturing method can include, after the step of inserting nanoparticles:
- an optional step of jacketing the preform with another silica tube to obtain a desired ratio between the core diameter and the cladding diameter;

a step of drawing the preform into the form of an optical fibre.

The nanoparticles can in particular comprise a refractory material, gold, silver and/or diamond. In the sense of the invention, a refractory material is defined, according to the standard ISO 836:2001, as a material other than a metal or an alloy, the pyrometric cone equivalent of which is at least equal to 1500° C. Such a material must thus resist a minimum temperature of 1500° C. without softening and without collapsing under its own weight. The refractory material is for example a refractory oxide such as aluminium oxide, also called alumina, zirconium oxide, also called zircone, or thorium oxide. Gold and silver have melting temperatures of 1064.18° C. and 961.78° C., respectively. These temperatures are in general greater than the upper limit of the predetermined range of measurement temperatures. Other metals could be used as long as their melting temperature is greater than this upper limit. Moreover, the nanoparticles could comprise certain borides, carbides, nitrides, silicides and/or sulphides.

In a specific embodiment, the nanoparticles are formed from particles of gold covered with a refractory material. In particular, the nanoparticles can be formed from particles of gold covered with zirconium oxide. These nanoparticles can be synthesised by two simultaneous methods: the chemical reduction of chloroauric acid ($HAuCl_4$) with sodium tetrahydridoborate (NaBH4) and the formation of a sol-gel matrix of zircone.

When the nanoparticles consist of zircone or comprise zircone, the heat treatment temperature is preferably chosen as less than or equal to 1150° C., in such a way as to favour the monoclinic phase of the zircone to the detriment of the tetragonal phase.

The manufacturing method can also include a step of depositing a protective coating on a cladding of the optical fibre. The protective coating can mechanically and/or chemically protect the optical fibre. It has for example a melting temperature greater than or equal to the upper limit of the predetermined range of measurement temperatures. The protective coating comprises for example a refractory material such as aluminium oxide or zirconium oxide. It can also comprise a metal such as aluminium, copper, gold, silver or nickel. It can also comprise a polymer or a silicone, optionally charged with particles of refractory material, for example aluminium oxide, zirconium oxide, silica or boron nitride.

The protective coating can also be determined in such a way as to improve the measurement sensitivity. In particular, the protective coating can include a material having an expansion coefficient higher than an expansion coefficient of the cladding of the optical fibre. When the optical fibre is subjected to an increase in temperature, it undergoes tensile stresses tending to amplify its elongation, and thus the modification of the properties of the Rayleigh backscattered signal.

The object of the invention is also a use of an optical fibre obtained by the manufacturing method as described above for a distributed measurement of temperature or of deformation by optical frequency domain reflectometry using the Rayleigh backscattered signal. The optical fibre can in particular be used for a measurement of temperature in a chamber of a nuclear reactor. It is thus subjected to high temperatures and to an irradiated environment.

BRIEF DESCRIPTION OF THE DRAWINGS

Other features, details and advantages of the invention will be clear upon reading the following description, given only as an example and made in reference to the appended drawings for which.

DETAILED DISCLOSURE OF SPECIFIC EMBODIMENTS

Figure 1:
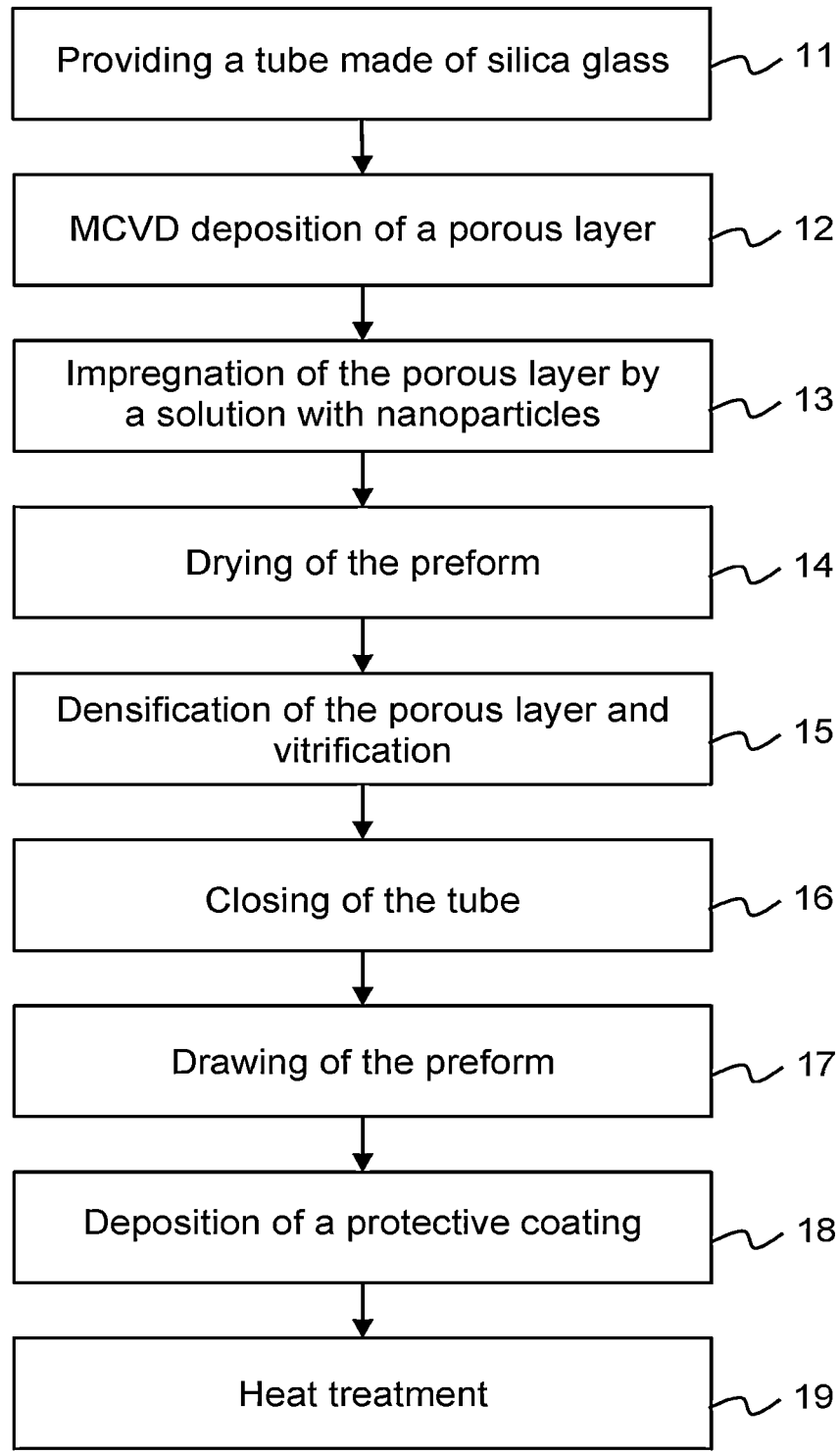
FIG. 1 shows an example of a method for manufacturing an optical fibre according to the invention.

FIG. 1 shows an example of a method for manufacturing an optical fibre according to the invention. The optical fibre includes a core surrounded by cladding and is intended to be used for a distributed measurement of temperature or of deformation by optical frequency domain reflectometry (OFDR). For this purpose, it includes nanoparticles inserted into its core, each nanoparticle having the effect of elastically scattering an optical signal passing through the optical fibre. This phenomenon is called Rayleigh scattering. During the measurement, the optical fibre is capable of being subjected to high temperatures, which can reach 800° C. or even 1000° C. In general, the range of temperatures to which the optical fibre is subjected during a measurement is called "range of measurement temperatures".

The method 10 comprises a first step 11 of manufacturing or providing a tube made of silica glass. The tube has for example an inner diameter of 19 mm and an outer diameter of 25 mm. Preferably, the silica glass has a degree of purity greater than or equal to 99%, more preferably greater than or equal to 99.8%, in such a way that the tube can form the cladding of the optical fibre. In a second step 12, a porous layer of amorphous silica is deposited by a modified chemical vapour deposition method, also called MCVD method. A mixture of gases comprising silicon tetrachloride ($SiCl_4$), germanium tetrachloride ($GeCl_4$), phosphoryl trichloride ($POCl_3$), dioxygen ($O_2$) and helium (He) is injected into the tube and brought to high temperature, typically between 1300° C. and 1500° C., in order to be deposited layer by layer on the inner surface of the tube. For reasons of homogeneity, the tube is preferably rotated about its longitudinal axis during this step 12 of deposition. The presence of germanium tetrachloride and of phosphoryl trichloride allows a porous layer of amorphous silica doped with germanium and with phosphorus to be obtained, which leads to increasing the refractive index of this porous layer so that it forms the core of the optical fibre. The tube and the porous layer form an assembly called "preform". In a third step 13, the porous layer of amorphous silica is impregnated by a solution comprising at least one solvent such as ethanol or water and nanoparticles. The solution can further include a sol of zirconium oxide (zircone) and/or a sol of silica. For example, a solution comprising ethanol, water, particles of gold and a sol of zircone is considered. The solution comprises 52.2% mol (molar percentage) of zirconium n-propoxide, 45.3% mol of acetylacetone, 1.1% mol of hydrated chloroauric acid and 1.4% mol of sodium tetrahydridoborate in a solvent. The zircone thus covers the particles of gold and forms a protective layer. After the step 13 of impregnation, the method comprises a step 14 of drying the preform. This step can be preceded by a step of removing the excess solution, that it to say the solution that has not penetrated the pores of the porous layer of silica. The drying of the preform is for example carried out at a temperature between 15° C. and 30° C. The method then comprises a step 15 of densification of the porous layer and then vitrification. The densification and the vitrification are carried out by subjecting the preform to a temperature greater than its glass transition temperature, or even greater than its melting temperature, then rapidly cooling to a temperature lower than the glass transition temperature. The densification and the vitrification are for example carried out at a temperature between 1700° C. and 2000° C. The densification allows the pores of the porous layer to be closed. In a sixth step 16, the preform is closed by subjecting it to a temperature between 1900° C. and 2200° C. The method then includes a seventh step 17 of drawing the preform, in such a way as to obtain an optical fibre having a desired diameter. Before the step 17 of drawing, the method can optionally include a step, not shown, of jacketing the preform in which the preform is inserted into a second tube made of silica glass, in order to obtain a preform having a desired ratio of core/cladding diameter. The assembly can then be drawn in such a way as to obtain the optical fibre. When the manufacturing method includes this jacketing step, the cladding is obtained from the first tube and from the second tube. The inner and outer diameters of the second tube are determined in such a way as to obtain a desired ratio between the diameter of the core and the diameter of the cladding. Optionally, the method can also include, after the step 17 of drawing the preform, a step 18 of depositing a protective coating on the cladding of the optical fibre. The protective coating can consist of a material resistant to high temperatures or include a polymer material loaded with particles of refractory material, for example with particles of zircone or of alumina. It should be noted that the particles of refractory material in the protective coating are not necessarily particles having a nanometric dimension, but can have a micrometric dimension. The protective coating has for example a melting temperature greater than or equal to the upper limit of the range of measurement temperatures.

According to the invention, the method then comprises a step 19 of heat treatment of the optical fibre. This heat treatment, also called "annealing", aims to stabilise the properties relative to the Rayleigh scattering of the optical fibre when it is subjected to high temperatures. These scattering properties depend on the physico-chemical properties of the optical fibre which are capable of being modified at high temperatures before reaching a stabilised state. The step 19 of heat treatment thus includes an exposition of the optical fibre to a heat treatment temperature greater than or equal to an upper limit of the range of measurement temperatures. The optical fibre is exposed to this heat treatment temperature for a treatment duration greater than or equal to one hour. According to a first alternative embodiment, the optical fibre is subjected to a heat treatment temperature that remains constant for the duration of treatment. The heat treatment temperature is for example equal to 800° C., 900° C., 1000° C., 1200° C. or 1500° C. According to a second alternative embodiment, the optical fibre is subjected to a cycle of temperatures comprising various plateaus at distinct heat treatment temperatures. In particular, the heat treatment temperature could be maximum for a first plateau, and decrease for each following plateau. The treatment duration is at least equal to one hour. The inventors have nevertheless observed that, for most of the optical fibres, a treatment duration greater than or equal to 8 hours, or even greater than or equal to 10 hours was desirable in order to obtain a stabilisation of the Rayleigh scattering properties.

Several hypotheses are proposed by the inventors to explain the phenomenon of stabilisation by heat treatment. A first hypothesis is based on the change in crystalline phase of the nanoparticles and the associated change in volume. For example, the zircone can successively and reversibly adopt three crystalline phases according to its temperature. A monoclinic phase is observed at the temperatures lower than 1150° C., a tetragonal phase is observed at the temperatures between 1150° C. and 2370° C. and a cubic phase is observed at the temperatures between 2370° C. and 2680° C. Initially, when the zircone is supplied by impregnation of the porous layer of silica, it is in amorphous form. During the steps of densification-vitrification and of closing, the zircone is subjected to temperatures that can reach 2200° C. and a part or the totality of the zircone present in the fibre consequently adopts a tetragonal phase. After cooling, the zircone should have a monoclinic phase. However, during the cooling, it is possible that the silica glass is already sufficiently viscous at 1150° C. to prevent the passage from the tetragonal phase to the monoclinic phase. A heat treatment of one to several hours at a heat treatment temperature between 800° C. and 1150° C. would allow this passage into monoclinic phase insofar as the tetragonal phase is metastable at these temperatures and the silica glass is close to its glass transition temperature, which would allow a local arrangement of the silica glass around the particles of zircone. The heat treatment would thus allow the crystalline phase of the nanoparticles to be stabilised and, subsequently, the Rayleigh scattering properties of the optical fibre. It should also be noted that the zircone has in the monoclinic phase a volume approximately 4.5% greater than in the tetragonal phase. The intensity of Rayleigh scattering can thus be amplified after heat treatment by this change in size of the nanoparticles. It is also possible that a portion of the zircone initially present in the fibre is still amorphous before the heat treatment of the fibre (and that the rest is already crystallised in tetragonal form). By heat treating the fibre above 400° C., the zircone which is amorphous could crystallise in tetragonal phase or in monoclinic phase (the latter could also change phase during the heat treatment). These modifications could also cause changes in the Rayleigh scattering properties of the optical fibre.

Another hypothesis that can explain the phenomenon of stabilisation of the Rayleigh scattering properties by heat treatment is based on a release of the stresses present in the optical fibre. Indeed, the optical fibre results from a process involving significant mechanical stresses and variations in temperature. This is in particular the case during the drawing step, during which the optical fibre undergoes rapid cooling. Subjecting the optical fibre to a heat treatment could cause a release of stresses and thus stabilised Rayleigh scattering properties.

Figure 2:
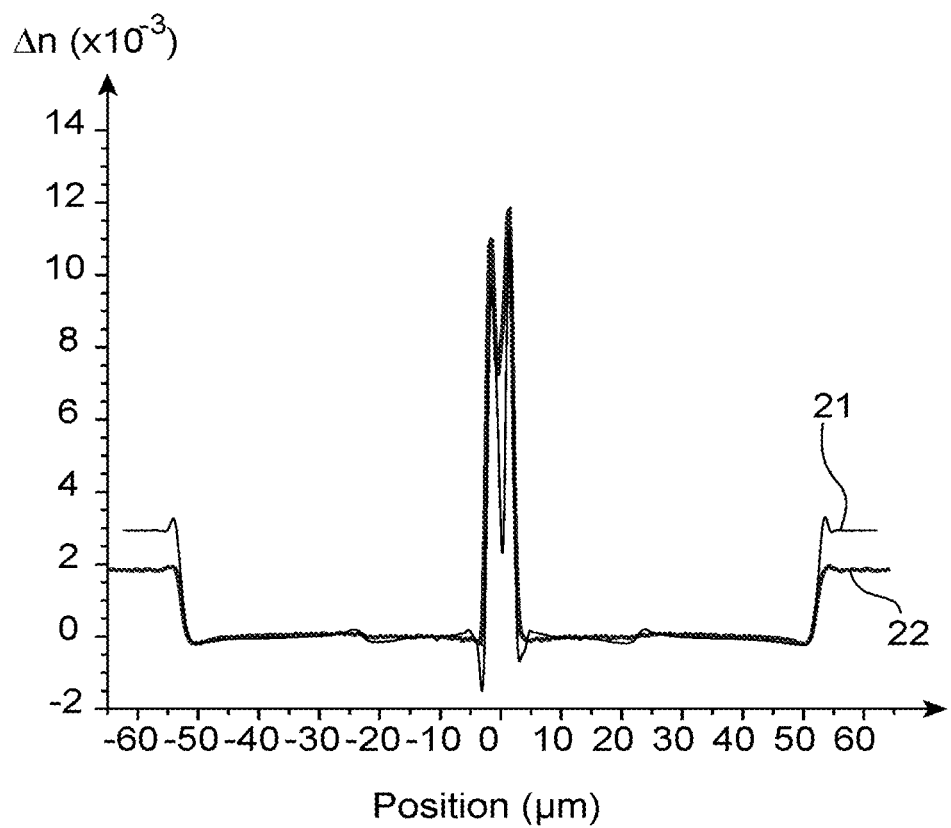
FIG. 2 shows, on a graph, the profile of refractive index of an optical fibre doped with nanoparticles of gold covered with zircone before and after a heat treatment according to the invention.

A third hypothesis is based on the change in refractive index in the core of the optical fibre. FIG. 2 shows, on a graph, the profile of refractive index of an optical fibre doped with nanoparticles of gold covered with zircone before and after heat treatment. The heat treatment comprised heating of the optical fibre to a temperature of 900° C. for a duration of 8 hours. On the graph, the axis of the abscissae corresponds to the position along a transverse axis of the optical fibre passing through the centre of the core, defined as the position 0, and the axis of the ordinates corresponds to the variation in index with respect to a reference refractive index. In this drawing, this reference index corresponds to the index at the optical cladding. A first curve 21 represents the variation in the refractive index of the optical fibre before heat treatment and a second curve 22 represents the variation in the refractive index after heat treatment. The curve 21 shows the presence of an "index hollow" at the centre of the optical fibre caused by the creation of the optical fibre from a hollow tube. It also shows the presence of an "index hollow" at the junction between the core and the cladding, as well as a jump in index near the position −22 μm and +22 μm, which correspond to the junction between the first and the second tube, the second tube having been added during the jacketing step. In comparison, the curve 22 shows a clear reduction in the "index hollow" at the centre of the fibre and at the junction between the core and the cladding, as well as a reduction in the jump in index caused by the jacketing. The heat treatment thus has the effect of increasing the average refractive index of the core of the optical fibre, and thus of increasing the numerical aperture of the optical fibre. This results in a greater confinement of the Rayleigh scattering in the core of the optical fibre, and thus in a greater intensity of the Rayleigh backscattered signal.

Figure 3:
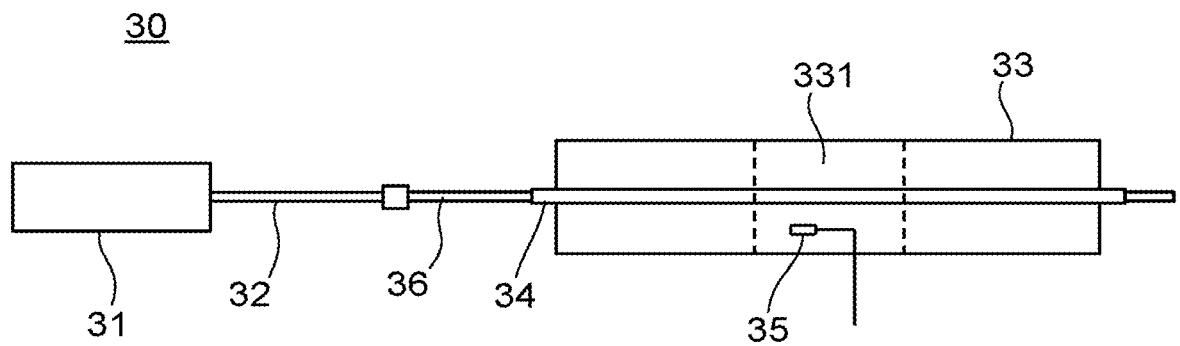
FIG. 3 schematically shows a system for testing and calibrating an optical fibre intended to be used for a distributed measurement of temperature or of deformation by optical frequency domain reflectometry.

FIG. 3 schematically shows a system for testing and calibrating an optical fibre intended to be used for a distributed measurement of temperature or of deformation by optical frequency domain reflectometry. The testing system 30 includes a frequency reflectometer 31, a single-mode optical fibre 32, an oven 33, a capillary 34 made of steel passing through the oven and a thermocouple 35. The optical fibre to be tested 36 is inserted into the capillary 34 made of steel and optically coupled with the single-mode optical fibre 32, for example by welding. The oven 33 has a central zone 331 in which the temperature is homogenous. The thermocouple 35 is placed in this central zone 331 to provide a reference temperature. The frequency reflectometer 31 here is an OBR 4600 from the company LUNA, with OBR being a brand registered by the company LUNA meaning "Optical Backscatter Reflectometer". It is capable of sending in the optical fibre 32 a frequency modulated optical measurement signal, of receiving a return optical signal coming from this fibre and of coupling this return optical signal with a reference optical signal coming from a reference optical fibre to form a compound signal. The frequency reflectometer 31 is further arranged to measure in terms of intensity and in terms of phase the interference fringes of this compound signal according to the frequency and the state of polarisation of the measurement signal and to apply a Fourier transform to a resulting signal to generate a map of reflection according to time, and thus of the position along the optical fibre 36. In order to measure a variation in temperature or in deformation, this map of reflection must be compared by cross-correlation in the frequency domain, for each section studied, to a map of reflection obtained for the same optical fibre 36 at a known temperature and for a known deformation. The correlation signal has a peak for each section studied, characterised by its position in terms of frequency. The frequency of the peak depends on the difference in temperature and the difference in deformation to which the optical fibre is subjected with respect to the known temperature and deformation. It is also possible to measure an absolute temperature on a section of optical fibre by carrying out a previous calibration. The fibre is heated to various temperatures controlled by the thermocouple 35 and the spectral movement associated with each temperature is recorded. A relationship of correlation can thus be established and used for a distributed measurement using the optical fibre.

Figure 4:
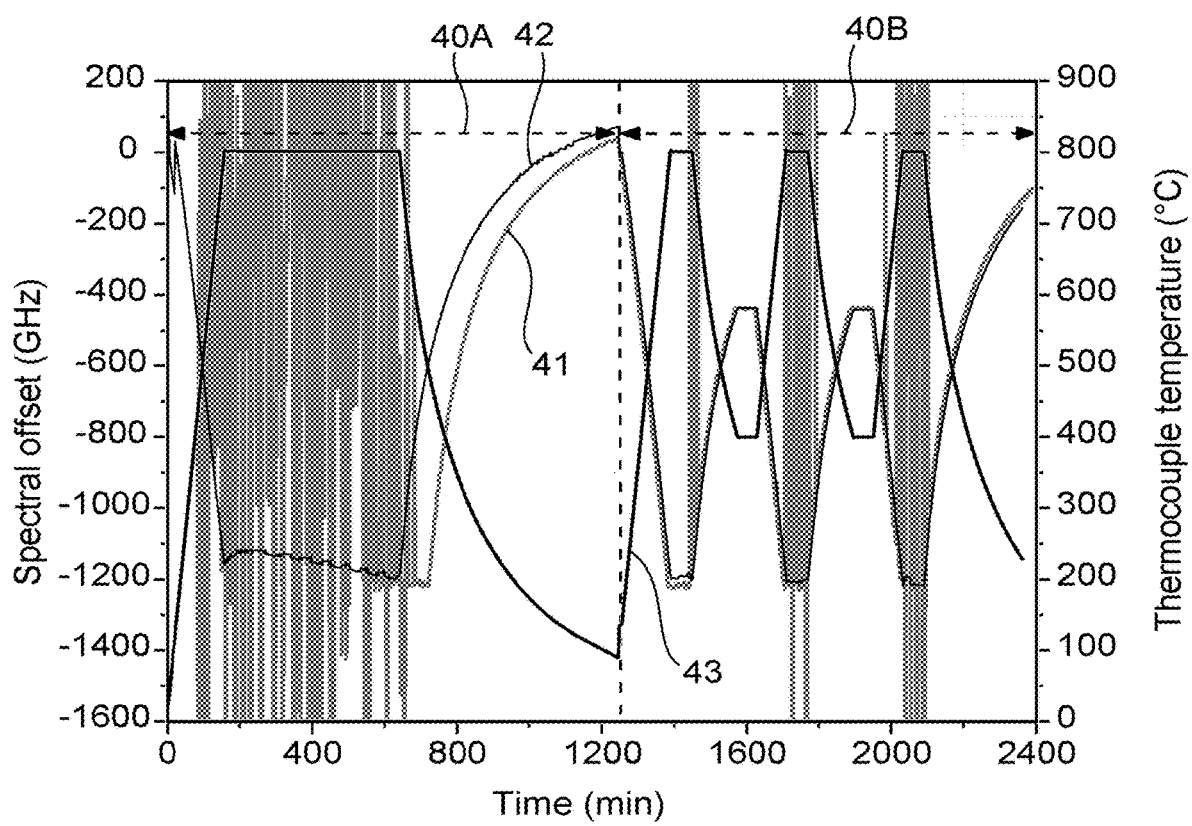
FIG. 4 shows, on a graph, results of spectral offset obtained using the system of FIG. 3 for a non-doped optical fibre and a doped optical fibre during a phase of heat treatment and a phase of cyclical testing.

FIG. 4 shows, on a graph, results of spectral offset obtained using the testing system of FIG. 3 for two distinct optical fibres during a phase of heat treatment 40A and during a later phase of cyclical testing 40B. On the graph, the axis of the abscissae represents the time, in minutes, a first axis of the ordinates represents the spectral offset, in gigahertz (GHz) and a second axis of the ordinates represents the temperature, in degrees Celsius (° C.), measured by the thermocouple 35. A first curve 41 represents the spectral offset for a single-mode optical fibre SMF-28 from the company Corning and a second curve 42 represents the spectral offset for a single-mode optical fibre including a core doped with nanoparticles formed by particles of gold covered with zircone. Each fibre is tested with an optical measurement signal having a spectral window of 86 nm centred on 1573 nm. The spectral offset is shown for a section of fibre located in the central zone of the oven by comparison to a map of reflection obtained for this same section between the phase of heat treatment and the phase of cyclical testing, at a time at which the temperature measured by the thermocouple 35 is 139° C. A third curve 43 represents the temperature measured in the central zone 331 of the oven 33 by the thermocouple 35. The heat treatment comprises a rise in temperature to 800° C. with an increase of 5° C./min, a plateau of 8 hours at the temperature of 800° C. and a decrease in temperature to 89.6° C. at a speed decreasing over time. The cyclical test comprises a succession of three plateaus at 800° C. separated by two plateaus at 400° C., each plateau having a duration of one hour. The rises and decreases in temperature are carried out with a variation of 5° C. per minute. FIG. 4 shows that both during the phase of heat treatment and during the phase of cyclical testing, the optical fibre SMF-28 has very high variations in the spectral offset, which make it unusable for a measurement of temperature or of deformation at a temperature greater than 400° C. It should be noted that no stabilisation of the spectral offset is observed after the heat treatment. For the optical fibre doped with nanoparticles, a deviation can be observed during the phase of heat treatment. However, during the cyclical test, a maximum error of 6.6% is observed at the temperature of 800° C. The spectral offset is thus relatively stable, and can be used to deduce therefrom a temperature or a deformation of the optical fibre.

The invention claimed is:

1. A method for manufacturing an optical fibre configured to be used for a distributed measurement of temperature or of deformation by optical frequency domain reflectometry using a Rayleigh backscattered signal, the optical fibre comprising a core into which nanoparticles are inserted, the optical fibre being configured to be subjected, during the measurement, to temperatures in a predetermined range of measurement temperatures, the method comprising, after a step of drawing a preform allowing the optical fibre to be formed, a step of heat treatment during which the optical fibre is subjected to a heat treatment temperature greater than or equal to an upper limit of the predetermined range of measurement temperatures for a duration greater than or equal to one hour.

2. The method according to claim 1, wherein the upper limit of the predetermined range of measurement temperatures is between 400° C. and 1200° C.

3. The method according to claim 1, wherein the duration of heat treatment is greater than or equal to 8 hours.

4. The method according to claim 1, wherein the step of heat treatment comprises heating the optical fibre in an oven or by application of a carbon dioxide laser beam to the optical fibre.

5. The method according to claim 1, further comprising a step of insertion of the nanoparticles into the core of the optical fibre, the step of insertion of nanoparticles into the core of the optical fibre being carried out on a preform comprising a tube made of silica glass and a porous layer of amorphous silica disposed on an inner surface of the tube, the step of insertion of nanoparticles comprising an impregnation of the porous layer by a solution comprising the nanoparticles.

6. The method according to claim 1, wherein the nanoparticles comprise at least one of a refractory material, gold, silver and diamond.

7. The method according to claim 6, wherein the nanoparticles are formed from particles of gold covered with a refractory material.

8. The method according to claim 1, comprising a step of depositing a protective coating on a cladding of the optical fibre, the protective coating having a melting temperature greater than or equal to the upper limit of the predetermined range of measurement temperatures.

9. A method of distributed measurement of temperature or of deformation comprising performing optical frequency domain reflectometry using the Rayleigh backscattered signal produced by the optical fibre manufactured by the method of claim 1.

10. The method according to claim 1, wherein the upper limit of the predetermined range of measurement temperatures is between 800° C. and 1100° C.

11. The method according to claim 1, wherein the duration of heat treatment is greater than or equal to 10 hours.

* * * * *